United States Patent
Wu

(10) Patent No.: US 12,358,590 B2
(45) Date of Patent: Jul. 15, 2025

(54) PEDAL

(71) Applicant: Chang-Hsin Wu, Chiayi County (TW)

(72) Inventor: Chang-Hsin Wu, Chiayi County (TW)

( * ) Notice: Subject to any disclaimer, the term of this patent is extended or adjusted under 35 U.S.C. 154(b) by 0 days.

(21) Appl. No.: 18/426,521

(22) Filed: Jan. 30, 2024

(65) Prior Publication Data

US 2024/0270345 A1 Aug. 15, 2024

(30) Foreign Application Priority Data

Feb. 14, 2023 (TW) .................................. 112105090

(51) Int. Cl.
| | |
|---|---|
| *B62M 6/50* | (2010.01) |
| *B62J 6/00* | (2020.01) |
| *B62M 3/08* | (2006.01) |
| *G01L 5/22* | (2006.01) |
| *H01R 39/64* | (2006.01) |

(52) U.S. Cl.
CPC ............ *B62M 6/50* (2013.01); *B62M 3/08* (2013.01); *G01L 5/225* (2013.01); *H01R 39/64* (2013.01); *B62J 6/00* (2013.01)

(58) Field of Classification Search
CPC .................................. B62M 3/08; B62M 6/50
See application file for complete search history.

(56) References Cited

U.S. PATENT DOCUMENTS

2012/0234108 A1* 9/2012 Janecek ................... B62J 45/42
73/862.338
2015/0253210 A1* 9/2015 Ashby ..................... F03G 5/064
702/41
2016/0052584 A1* 2/2016 Sasaki ....................... G01L 3/24
74/594.4

(Continued)

FOREIGN PATENT DOCUMENTS

| CN | 201189940 Y | * | 2/2009 | ............. B62M 3/08 |
| CN | 201211851 Y |   | 3/2009 | |

(Continued)

OTHER PUBLICATIONS

USPTO Machine Translation of the Description of WO 2019/091146 A1, Bu et al., May 16, 2019. (Year: 2025).*

*Primary Examiner* — Daniel D Yabut
(74) *Attorney, Agent, or Firm* — Li & Cai Intellectual Property (USA) Office

(57) ABSTRACT

A pedal includes a pedal body, a force detection module, a rotation shaft, an insulating sleeve, electrically conductive rings, and contact elements. The pedal body has a first accommodating space and a second accommodating space. The force detection module is disposed in the first accommodating space. The rotation shaft passes through the pedal body. Annular accommodating regions and wire perforations are recessed from a surface of the rotation shaft. Transmission wires pass through the wire perforations. The insulating sleeve is sleeved on the rotation shaft. Annular insulating regions are recessed from a surface of the insulating sleeve and correspondingly cover the annular accommodating regions. The electrically conductive rings are respectively sleeved on surfaces of the annular insulating regions, and the transmission wires are correspondingly coupled to the electrically conductive rings. The contact elements abut against the electrically conductive rings, respectively.

10 Claims, 5 Drawing Sheets

(56) References Cited

U.S. PATENT DOCUMENTS

2019/0299388 A1* 10/2019 Blumenthal ............ B26B 13/28
2022/0411012 A1* 12/2022 Favero .................. B62J 45/411

FOREIGN PATENT DOCUMENTS

| CN | 109421881 B * | 6/2020 | ......... A63B 24/0062 |
| FR | 2778887 A1 * | 11/1999 | ............. B62M 3/08 |
| FR | 3078158 A1 * | 8/2019 | ............. B62J 45/40 |
| TW | M400441 U1 | 3/2011 | |
| TW | M632070 U | 9/2022 | |
| WO | WO-2019091146 A1 * | 5/2019 | ............. B62M 3/08 |
| WO | WO-2021105951 A1 * | 6/2021 | ............ B62J 45/411 |

* cited by examiner

PEDAL

CROSS-REFERENCE TO RELATED PATENT APPLICATION

This application claims the benefit of priority to Taiwan Patent Application No. 112105090, filed on Feb. 14, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a pedal, and more particularly to a pedal that can be disposed in an electric-assist bicycle and have a force detection and transmission mechanism for detecting a force applied by a foot of a rider and transmitting a signal to a control module of the electric assist bicycle such that assistive power is instantaneously provided.

BACKGROUND OF THE DISCLOSURE

An electric-assist bicycle is a bicycle that mainly adopts human power and uses electric power as secondary power. In order to understand needs of the rider and to provide the electric power for assistance, a sensor is required as a medium for communicating information between the rider and the bicycle. The purpose of the sensor is to estimate an actual movement condition of the rider and transmit such information to a control module, such that a motor can provide appropriate power for a scenario.

Two types of sensors are provided in existing electric-assist bicycles, one being a speed sensor and the other being a torque sensor. One of the disadvantages of the speed sensor is that the speed sensor cannot easily determine a difference in pedaling force caused by the change in slope. On the other hand, the torque sensor senses the torque generated by pedaling of the rider. That is, the torque sensor detects a force of pedaling and provides appropriate assistance.

However, existing torque sensors are usually located in a wheel axle or in a center-mounted motor, and are unable to more instantaneously sense the force exerted by the feet of the rider on the pedals.

Therefore, how to overcome the aforementioned problems by improving the structural design, such that the electric assist bicycle can more immediately sense the actual movement condition of the rider, has become an issue to be addressed in the relevant field.

SUMMARY OF THE DISCLOSURE

In response to the above-referenced technical inadequacies, the present disclosure provides a pedal, and the force detection and transmission mechanism are integrated in the pedal for more immediately sensing the actual movement condition of the rider.

In order to solve the above-mentioned problems, one of the technical aspects adopted by the present disclosure is to provide a pedal. The force detection and transmission mechanism includes a pedal body, a force detection module, a rotation shaft, an insulating sleeve, a plurality of electrically conductive rings, and a plurality of contact elements. The pedal body has a first accommodating space and a second accommodating space. The second accommodating space is in fluid communication (e.g., spatial communication) with the first accommodating space. The force detection module is disposed in the first accommodating space. The rotation shaft passes through the second accommodating space of the pedal body. The rotation shaft is hollow and accommodates a plurality of transmission wires. A plurality of annular accommodating regions and a plurality of wire perforations are recessed from a surface of the rotation shaft, the plurality of wire perforations penetrate the plurality of annular accommodating regions to an inside of the rotation shaft, respectively, and the plurality of transmission wires pass through the plurality of wire perforations, respectively. The insulating sleeve is sleeved on the rotation shaft. A plurality of annular insulating regions are recessed from a surface of the insulating sleeve, and the plurality of annular insulating regions correspondingly cover the plurality of annular accommodating regions. The plurality of electrically conductive rings are respectively sleeved on surfaces of the plurality of annular insulating regions, and the plurality of transmission wires are correspondingly coupled to the plurality of electrically conductive rings. The plurality of contact elements are disposed in the second accommodating space. The plurality of contact elements abut against the plurality of electrically conductive rings, respectively. A signal wire of the force detection module extends from the first accommodating space to the second accommodating space and is connected to the plurality of contact elements, such that signals from the force detection module are sequentially transmitted outward through the plurality of contact elements, the plurality of electrically conductive rings, and the plurality of transmission wires.

Therefore, in the force detection and transmission mechanism for a pedal provided by the present disclosure, by virtue of the plurality of contact elements abutting against the plurality of electrically conductive rings, respectively, signals from the force detection module can be sequentially transmitted outward through the plurality of contact elements, the plurality of electrically conductive rings, and the plurality of transmission wires, such that real-time detection and transmission functions of an electric assist bicycle are improved. In the present disclosure, the force detection and transmission mechanism are integrated to the pedal so as to sense an actual movement condition of a rider in a timely manner.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
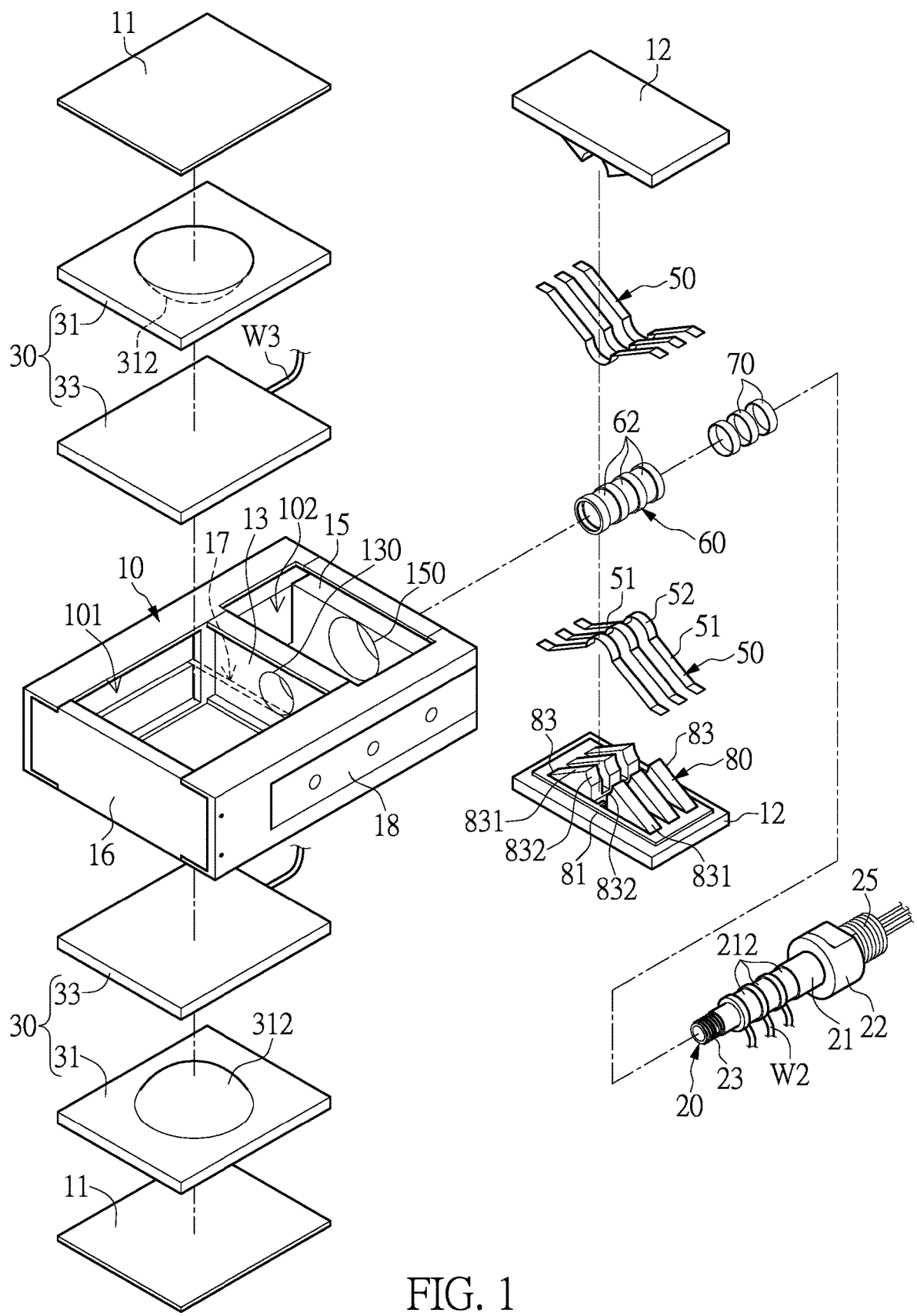
FIG. 1 is a schematic exploded view of a pedal assembly according to the present disclosure.
Figure 2:
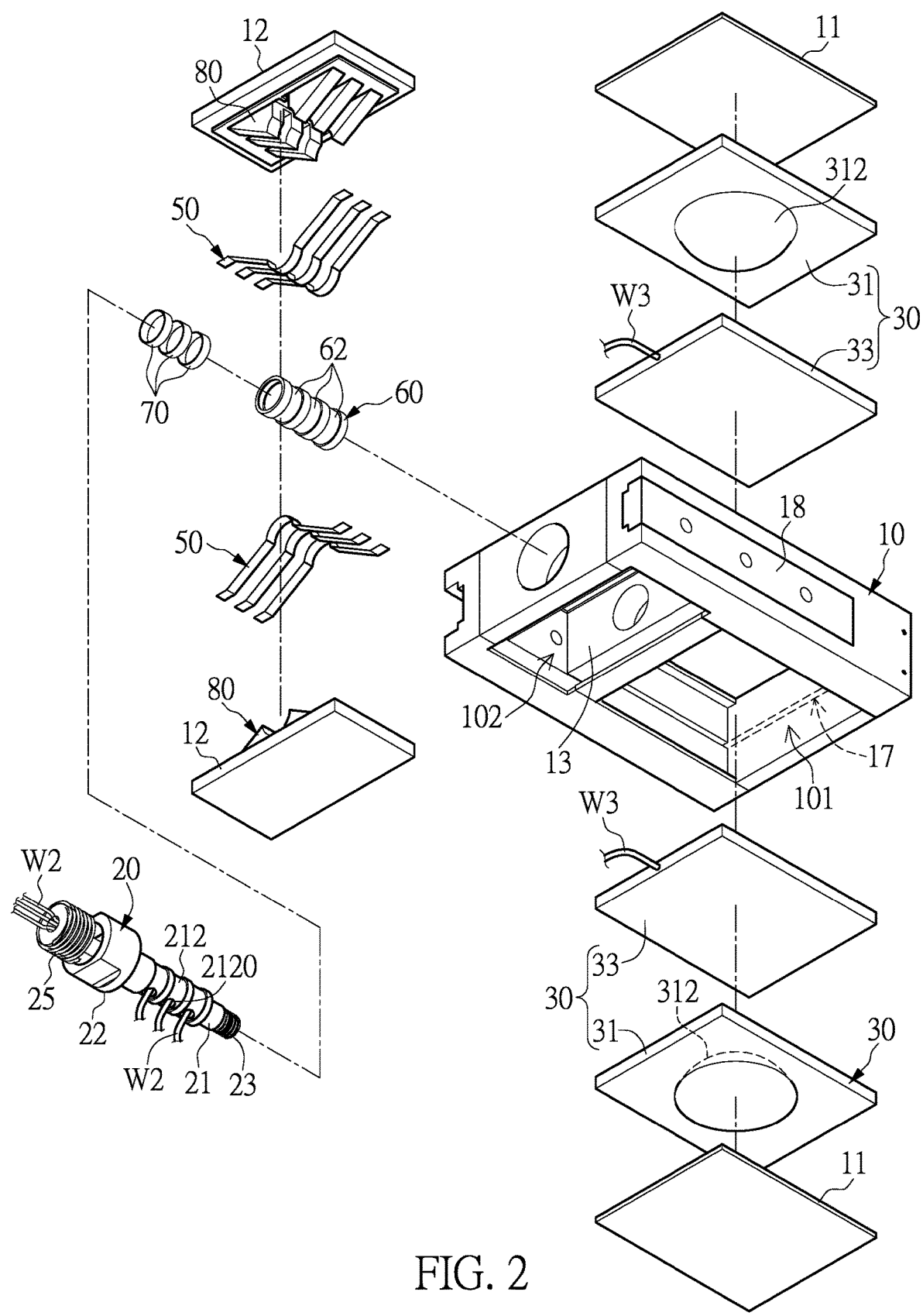
FIG. 2 is another schematic exploded view of the pedal assembly according to the present disclosure.
Figure 3:
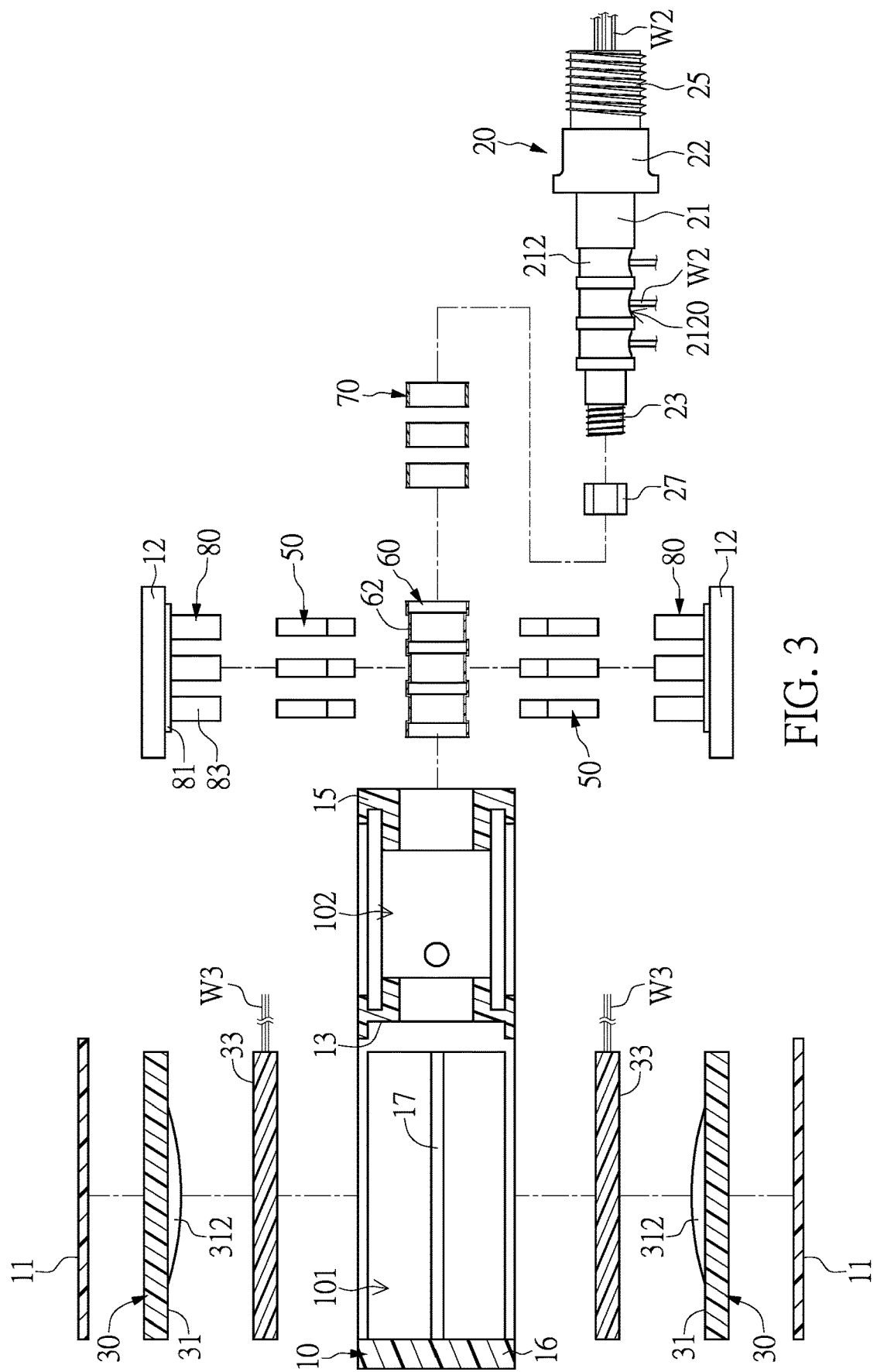
FIG. 3 is a schematic cross-sectional exploded view of the pedal assembly according to the present disclosure.
Figure 4:
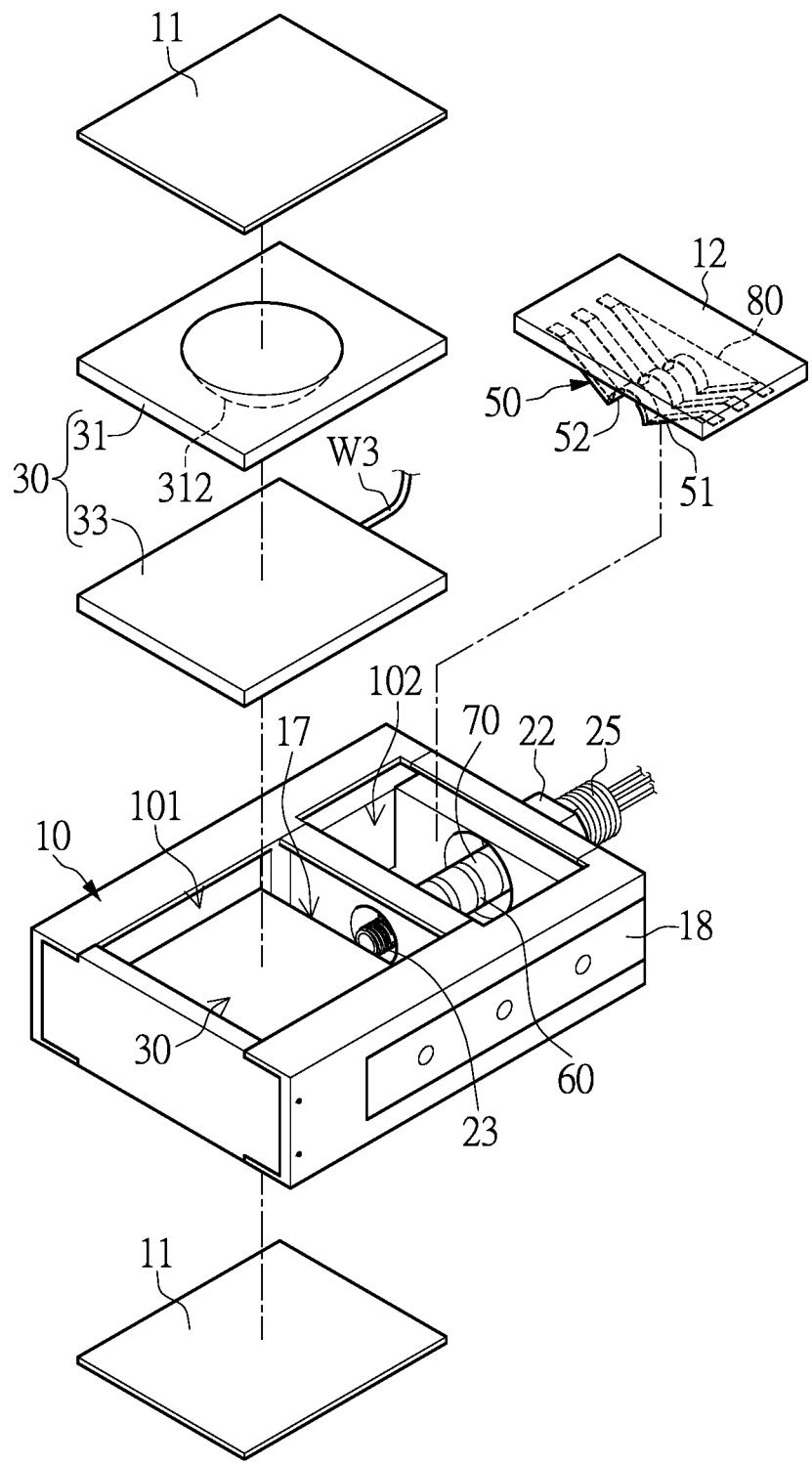
FIG. 4 is a schematic partially assembled view of the pedal assembly according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Embodiment

Referring to FIG. 1 to FIG. 5, one embodiment of the present disclosure provides a force detection and transmission mechanism for a pedal, and the force detection and transmission mechanism can be referred to as a pedal assembly. The force detection and transmission mechanism includes a pedal body 10, a rotation shaft 20, a force detection module 30, a plurality of contact elements 50, an insulating sleeve 60, and a plurality of electrically conductive rings 70.

The pedal body 10 has a first accommodating space 101 and a second accommodating space 102. The second accommodating space 102 is in fluid communication with the first accommodating space 101. Specifically, the pedal body is a square frame and includes a partition 13, an inner panel 15, an outer panel 16, and a middle partition 17. The pedal body 10 further includes two first cover plates 11 and two second cover plates 12. The two first cover plates 11 cover the first accommodating space 101, and the two second cover plates 12 cover the second accommodating space 102. The partition 13 is located between the inner panel 15 and the outer panel 16, and between the first accommodating space 101 and the second accommodating space 102. In other words, the partition 13 divides an internal space of the pedal body 10 into the first accommodating space 101 and the second accommodating space 102. An assembly hole 150 is formed on the inner panel 15, a connection hole 130 is formed on the partition 13, and the rotation shaft 20 passes through the assembly hole 150 and the connection hole 130.

The force detection module 30 is disposed in the first accommodating space 101. In this embodiment, the pedal body 10 has two of the force detection modules 30 disposed therein. The first accommodating space 101 of the pedal body 10 is divided into two halves by the middle partition 17, and each of the two halves of the first accommodating space 101 respectively accommodates one of the two force detection modules 30. In this embodiment, each of the force detection modules 30 includes a force application plate 31 and a force sensor 33. The force application plate 31 receives an external force from the pedal body 10 being stepped on and applies a force to the force sensor 33 to generate a signal. Specifically, the force application plate 31 includes an elastic force application portion 312, and the elastic force application portion 312 abuts against the force sensor 33. The force detection module 30 can be a static sensor, a pressure sensor, or a dielectric sensor that converts different magnitudes of received forces into signals having different intensities. However, the present disclosure is not limited thereto.

The rotation shaft 20 passes through the second accommodating space 102 of the pedal body 10. The rotation shaft 20 is hollow and accommodates a plurality of transmission wires W2. A plurality of annular accommodating regions 212 and a plurality of wire perforations 2120 are recessed from a surface of the rotation shaft 20, and the plurality of wire perforations 2120 penetrate through the plurality of annular accommodating regions 212 to an inside of the rotation shaft 20, respectively. The plurality of transmission wires W2 penetrate through the plurality of wire perforations 2120, respectively.

Figure 5:
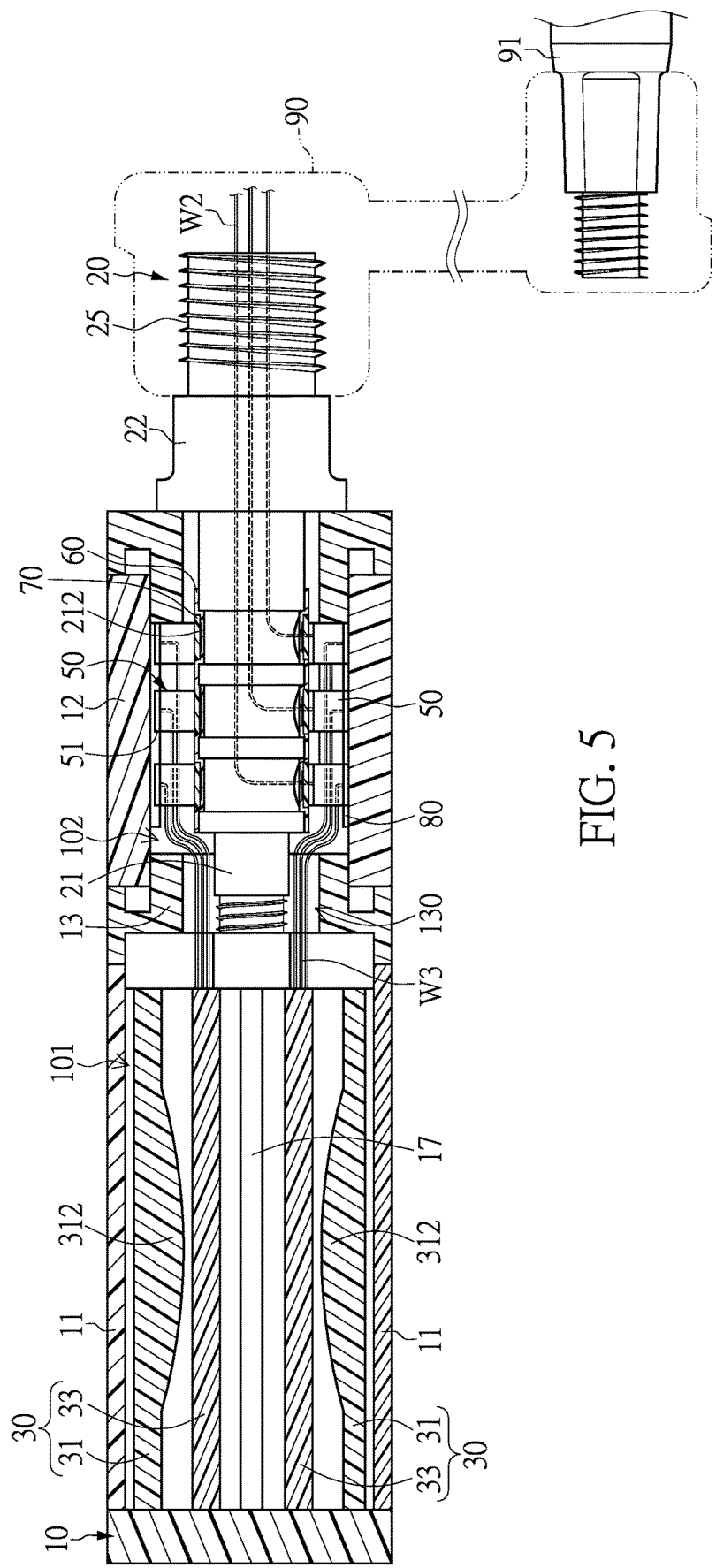
FIG. 5 is a schematic cross-sectional assembled view of the pedal assembly according to the present disclosure.

Specifically, the rotation shaft 20 includes a detection shaft portion 21, a stopping block 22, a crank connector 25, and a screw connector 23. The detection shaft portion 21 is located between the screw connector 23 and the stopping block 22. The crank connector 25 is located external to the stopping block 22 for being threadedly connected to a crank 90 (as shown in FIG. 5) of a bicycle. The screw connector 23 is located at one end of the detection shaft portion 21 to match with a screw nut 27 (as shown in FIG. 5), such that the rotation shaft 20 is rotatably disposed in the pedal body 10. In order to enable the rotation shaft 20 to smoothly rotate in the pedal body 10, existing bearings (not shown in the figures) may be further disposed in the pedal body 10. The plurality of annular accommodating regions 212 are formed in the detection shaft portion 21.

Specifically, one end of each of the plurality of transmission wires W2 penetrates out from the crank connector 25 of the rotation shaft 20, and can pass through a rear hub 91 of the bicycle along the crank 90 to be connected to a control module of the bicycle. Another end of each of the plurality of transmission wires W2 penetrates through a corresponding one of the plurality of wire perforations 2120.

Because the rotation shaft 20 is generally made of metal and is thus electrically conductive, the present disclosure provides the insulating sleeve 60 for insulation. The insulating sleeve 60 is made of an electrically insulating material and is a film. A shape of the insulating sleeve 60 corresponds to a shape of the detection shaft portion 21. A plurality of annular insulating regions 62 are recessed from a surface of the insulating sleeve 60, and the plurality of annular insulating regions 62 correspondingly cover the plurality of annular accommodating regions 212.

The plurality of electrically conductive rings 70 are respectively sleeved on surfaces of the plurality of annular insulating regions 62, and the plurality of transmission wires W2 are correspondingly coupled to the plurality of electrically conductive rings 70. For example, the plurality of transmission wires W2 can be soldered to inner sides of the plurality of electrically conductive rings 70, respectively. In other embodiments, core portions (not shown in the figures) of the plurality of transmission wires W2 can be respectively coiled on the surfaces of the plurality of annular insulating regions 62, and the plurality of electrically conductive rings 70 surround the core portions to form electrical connection.

The plurality of contact elements 50 are disposed in the second accommodating space 102. The plurality of contact elements 50 abut against the plurality of electrically conductive rings 70, respectively. The plurality of contact elements 50 are preferably made of metal that has good elasticity and that is abrasion resistant, and the plurality of contact elements 50 function similar to an electrically conductive brush in the present disclosure. In this embodiment, by the plurality of contact elements 50 continuously abutting against the plurality of electrically conductive rings 70, when the pedal assembly rotates relative to the crank 90, the plurality of transmission wires W2 are unaffected and are not twisted by the rotation.

An elastic support force is provided for the plurality of contact elements 50 to ensure a contact between the plurality of contact elements 50 and the plurality of electrically conductive rings 70. Two elastic support members 80 that are respectively disposed on the two second cover plates 12 are provided in this embodiment. Each of the two elastic support members 80 includes a plurality of support plates 83 that are preferably made of elastic insulating materials such as plastic. The plurality of support plates 83 are disposed on the two second cover plates 12, and the plurality of contact elements 50 are disposed on the plurality of support plates 83, respectively.

Specifically, the plurality of support plates 83 are arranged in pairs and disposed apart from each other on two base plates 81, and the two base plates 81 are fixed to the two second cover plates 12, respectively. Shapes of the plurality of support plates 83 correspond to shapes of the plurality of contact members 50. Each of the support plates 83 has a beveled surface 831 and an arced concave surface 832. However, the present disclosure is not limited thereto, and each of the two elastic support members 80 can be integrally formed. In other words, two support bodies can be formed to replace the two elastic support members 80, and a plurality of concave bevel can be formed on outer bevels of the two support bodies for respectively accommodating extension fixing portions of the plurality of contact members 50.

Each of the contact elements 50 has a friction contact portion 52 and two extension fixing portions 51. The friction contact portion 52 is substantially arch-shaped, and the two extension fixing portions 51 are connected to two ends of the friction contact portion 52, respectively. Each of the two extension fixing portions 51 abuts against the beveled surface 831 of a corresponding one of the support plates 83, and the friction contact portion 52 abuts against the arced concave surface 832 of the corresponding one of the support plates 83. However, the present disclosure is not limited thereto. For example, a contact element can be implemented by using a carbon brush of a motor, and a compression spring can be used such that the contact element can elastically and continuously abut against the plurality of electrically conductive rings 70.

By the aforementioned structural arrangements in the present disclosure, a signal wire W3 of the force detection module 30 extends from the first accommodating space 101 to the second accommodating space 102 and is connected to the plurality of contact elements 50, such that signals from the force detection module 30 are sequentially transmitted outward through the plurality of contact elements 50, the plurality of electrically conductive rings 70, and the plurality of transmission wires W2.

In addition, in the embodiment of the present disclosure, two of the force detection modules 30 and two groups of the plurality of contact elements 50 are provided; however, in other embodiments, a quantity of the force detection module 30 can be one, and one group of the plurality of contact elements 50 can be provided for being applied to strapped pedals or clipless pedals. Furthermore, a quantity of the electrically conductive rings 70 is not limited to being what is shown in the figures, and the quantity of the electrically conductive rings 70 can be more than three. Moreover, structures similar to the aforementioned contact elements 50 and the elastic support members 80 of the present disclosure can be applied to a rear hub of a bicycle.

In addition, in the present disclosure, the force detection and transmission mechanism for a pedal can further include a lighting element 18 that is such as an LED light plate, and the lighting element 18 can be disposed on a lateral side of the pedal body 10. By the arrangement of wires in this embodiment, an electrical wire (omitted in the figures) of the lighting element 18 can be arranged in a manner similar to the signal wire W3 of the force detection module 30. That is, the electrical wire passes through the second accommodating space 102, contacts the plurality of contact elements 50, and is electrically connected with the plurality of electrically conductive rings 70, so as to obtain continuous electrical power from the plurality of transmission wires W2.

Beneficial Effects of the Embodiment

In conclusion, in the force detection and transmission mechanism for a pedal provided by the present disclosure, by virtue of the plurality of contact elements abutting against the plurality of electrically conductive rings, respectively, signals from the force detection module can be sequentially transmitted outward through the plurality of contact elements, the plurality of electrically conductive rings, and the plurality of transmission wires, such that real-time detection and transmission functions of an electric assist bicycle are improved. In the present disclosure, the force detection and transmission mechanism are integrated to the pedal so as to sense an actual movement condition of a rider in a timely manner.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A pedal, comprising:
   a pedal body having a first accommodating space and a second accommodating space, wherein the second accommodating space is in fluid communication with the first accommodating space;
   a force detection module disposed in the first accommodating space;
   a rotation shaft passing through the second accommodating space of the pedal body, wherein the rotation shaft is hollow and accommodates a plurality of transmission wires; wherein a plurality of annular accommodating regions and a plurality of wire perforations are recessed from a surface of the rotation shaft, the plurality of wire perforations penetrate the plurality of annular accommodating regions to an inside of the rotation shaft, respectively, and the plurality of transmission wires pass through the plurality of wire perforations, respectively;
   an insulating sleeve being sleeved on the rotation shaft, wherein a plurality of annular insulating regions are recessed from a surface of the insulating sleeve, and the plurality of annular insulating regions correspondingly cover the plurality of annular accommodating regions;
   a plurality of electrically conductive rings, wherein the plurality of electrically conductive rings are respectively sleeved on surfaces of the plurality of annular insulating regions, and the plurality of transmission wires are correspondingly coupled to the plurality of electrically conductive rings; and
   a plurality of contact elements disposed in the second accommodating space, wherein the plurality of contact elements abut against the plurality of electrically conductive rings, respectively;
   wherein a signal wire of the force detection module extends from the first accommodating space to the second accommodating space and is connected to the plurality of contact elements, such that signals from the force detection module are sequentially transmitted outward through the plurality of contact elements, the plurality of electrically conductive rings, and the plurality of transmission wires.

2. The pedal according to claim 1, wherein the pedal body further includes an inner panel, a partition, and an outer panel, and the partition is located between the inner panel and the outer panel and between the first accommodating space and the second accommodating space, and wherein an assembly hole is formed on the inner panel, a connection hole is formed on the partition, and the rotation shaft passes through the assembly hole and the connection hole.

3. The pedal according to claim 1, wherein the pedal body further includes two first cover plates and two second cover plates, the two first cover plates cover the first accommodating space, and the two second cover plates cover the second accommodating space.

4. The pedal according to claim 3, further comprising two elastic support members being respectively disposed on the two second cover plates, wherein each of the two elastic support members includes a plurality of support plates, the plurality of support plates are disposed on the two second cover plates, and the plurality of contact elements are disposed on the plurality of support plates, respectively.

5. The pedal according to claim 4, wherein the plurality of support plates are arranged in pairs and disposed apart from each other on two base plates, the two base plates are fixed to the two second cover plates, respectively, and each of the support plates has a beveled surface and an arced concave surface.

6. The pedal according to claim 5, wherein each of the contact elements has a friction contact portion and two extension fixing portions, and the two extension fixing portions are connected to two ends of the friction contact portion, respectively; wherein each of the two extension fixing portions abuts against the beveled surface of a corresponding one of the support plates, and the friction contact portion abuts against the arced concave surface of the corresponding one of the support plates.

7. The pedal according to claim 1, wherein the force detection module includes a force application plate and a force sensor, and wherein the force application plate receives an external force and applies a force to the force sensor to generate a signal.

8. The pedal according to claim 1, wherein the rotation shaft includes a detection shaft portion, a stopping block, a crank connector, and a screw connector; wherein the detection shaft portion is located between the screw connector and the stopping block, the crank connector is located external to the stopping block, and the screw connector is located at one end of the detection shaft portion; wherein the plurality of annular accommodating regions are formed in the detection shaft portion.

9. The pedal according to claim 8, wherein a shape of the insulating sleeve corresponds to a shape of the detection shaft portion.

10. The pedal according to claim 1, further comprising a lighting element, wherein the lighting element is disposed on a lateral surface of the pedal body.

* * * * *